Patented July 11, 1939

2,165,256

UNITED STATES PATENT OFFICE 2,165,256

RADIO BEACON

Clarence W. Hansell, Port Jefferson, N. Y., assignor to Radio Corporation of America, a corporation of Delaware Application March 30, 1935, Serial No. 13,812

6 Claims. (Cl. 250—11)

This invention relates to radio signalling systems of the beam or beacon type by means of which a course or path, which a moving craft may follow, is marked out. More in particular, this invention relates to a new radio signalling system in which a plurality of beams of radiant energy are transmitted along the boundary of a path or course to "box in" the course or path in such a manner that a moving craft, as, for instance, an airship with a receiver thereon, may follow said beams and utilize the same to indicate the direction of flight of the aircraft thereby causing the aircraft to follow the beams or beacons into a safe landing.

Radio signalling systems of the beam or beacon type have been known heretofore in the art. Generally these systems include means for transmitting a beam of radiant energy signals modulated in some manner which a plane may receive and use to guide its flight. Systems known heretofore are ineffectual to guide a moving vehicle in cases where fog is common or other conditions exist which prevent the pilot of the moving craft from seeing the land over which he is flying and the landing field. This defect is due to the fact that the radio beacons, known heretofore in the art, are guides only with respect to angular positions, that is, compass positions with reference to the point from which the signals are radiated. In other words, radio beacons known heretofore in the art provided means whereby the receiver's angular position with respect to the point from which signals are radiated could be determined but did not provide means whereby the operator could predetermine his glide angle to ground.

An object of this invention is to provide a novel and simple means whereby an aircraft may be guided to a safe landing in any weather conditions even though the operator is flying blind and can not see the ground or surrounding objects adjacent the landing field.

Another object of this invention is to provide a radio transmitting system of the beacon or beam type which radiates signals in such a manner that the operator of an aircraft which carries a receiver tuned to said signals may, in fog or in a heavy snowstorm, bring the craft to a safe landing on the landing field.

The above object is attained by the use of a radio transmitting system including means for radiating a beam of signal modulated energy on each side of the path which the aircraft is to follow and also radiating two signal modulated beams, one above and one below the path which the aircraft should follow into the port to make a safe landing at the desired point. Actually, applicant's novel beacon system transmits radiated energy in such a manner as to totally enclose a channel of air with signal modulated radiations in such a manner that an aircraft may follow said channel into the landing field.

Each beam radiated is signal modulated in such a manner as to warn the operator of the aircraft when he approaches the beam and tends to leave the channel leading him into the proper landing.

In accordance with a preferred embodiment of the invention, the radio signalling system includes four beam transmitters of like frequency, each modulated with a distinct signal which is recognizable to the pilot of a plane receiving these signals. Each beam of radio radiation is so directed that they are all of equal intensity along the line of flight which the pilot is to follow in landing. One beam is directed along the right edge of the path, a second beam is directed along the left edge of the path, a third beam is directed along the lower edge of the path at the desired angle, and a fourth beam is directed along the upper edge of the path at the proper angle to lead the aircraft to a safe landing. These beams may each be modulated by a characteristic signal so that the operator will know which beam he is receiving and guide his craft in accordance with said information. For example, the beam directed to the right of the path may be modulated to repeat rapidly the word "left"; the beam directed to the left of the path may be modulated in a similar manner to repeat the word "right"; the beam directed just below the desired path may be modulated to repeat the word "up"; while, the beam directed above the course may be modulated to repeat the word "down".

Preferably, the radiating systems described above are used with a long distance beacon of the crossed loop type which serves the pilot until he approaches the field and starts to land, then he is guided by the beacon enclosing the channel which he must follow to make a safe landing at the desired point. In landing, if the pilot dips his plane too rapidly he will hear from a radio receiver the words "up—up" quite strongly and will turn his plane up. If he should fly too high the beam carrying the words "up—up" will be heard very weakly or not at all and he will hear instead the modulation from the beam directed from the desired channel and will hear the word "down" repeated at frequent intervals. This will cause the pilot to dip his plane more so that he will not reach the ground past the desired landing point. The beams located at the right and the left of the channel will take care of his flight in the horizontal direction. If he goes too far to the left of the channel he will hear the words "right—right" repeated loudly. In a similar manner, if he flies too far to the right of the channel he will hear the words "left—left" repeated.

In order that this beacon system shall be made effective and that the beams of energy shall be sharp enough or directive enough to make the system practical, very short wave radio beams should be used. The transmitted signals may be modulated by means of signal currents derived from phonograph records.

In order that the modulation shall be at all times intelligible, the modulation should be so synchronized that there will be a sequence in regular order as for instance "right—left—up—down—right—left—up—down — — —". In this scheme the "right—left" signals will be close enough together to judge relative intensities, and the same result will be had by the sequence "up—down".

The radio receiver may use an aural or a visual indicator. An aural indicator is preferable in some cases because it allows the pilot to have the use of his eyes to operate the plane and watch the landing field. In any event the receiver should include an automatic volume control in order to prevent unduly strong signals from reaching the indicator. If the receiver uses the visual indicator, as, for instance, the reed indicator, each of the beams may be modulated with a different frequency signal so that the groups of reeds in the receiver will only respond to signals from a certain beam.

A more complete understanding of the invention will be had from the following detailed description when read in connection with the drawing, in which:

Figure 1 is a schematic showing of a course-marking transmitter arranged in accordance with my invention.

Figure 2 shows typical power radiation patterns of the four beams which "box in" the path of flight so that the incoming craft may be brought safely to earth at the desired point on the landing field.

Figure 3 shows diagrammatically a landing field over which the upper and lower guide beams are radiated in accordance with my invention, the "boxed in" path of flight with respect to the landing field and guiding beams being represented in a vertical plane.

Referring in particular to Figure 2, 1 indicates a landing field enclosure and 3 indicates the point at which a short wave radio beam transmitter is located. This beam radiates a sharply directive, high frequency carrier modulated at signal frequency by constant repetitions of the word "down". 4 indicates diagrammatically a short wave radio beam radiator similar to the one shown at 3 which may radiate a wave similarly modulated by the word "up". Each of these beacons is highly directive. They may be of any type such as for example of the type disclosed in Carter U. S. Patent #1,909,610. Since the radiators per se form no part of the present invention, they need not be described in detail here.

Third and fourth short wave directive radio transmitters, located at 3, see Fig. 3, transmit beams at a slowly diverging angle along the landing path. The beam at the right of the path looking toward the apex of the angle, e. g., toward the landing point, may be modulated by the word "left" and the beam at the left may be modulated by the word "right".

Although these beacons are shown located at the sides of the field they are preferably arranged so that their fields balance just at the ground at the point 2. For points passed by the pilot before reaching the field all of the beams balance on a line running through the point 2 and at the proper angle with respect to the ground.

Let it be understood at this point that the beams in this invention will be in addition to the regular long distance beam, and that the aircraft will be led by the long distance beam to a region within the domination of the four beams of this invention.

In order not to miss the landing field to right or left, the beams 5 and 6 of Fig. 3 are used, one modulated by the word "left" and the other by the word "right", the correct path being along a vertical plane of constant ratio of signal intensity.

The horizontal plane of constant ratio signal intensity being the smooth path of descent of the incoming aircraft is formed by the "up" "down" beams and is tentatively shown in Fig. 3 as gently landing a plane.

A crossed loop long distance beacon may also be mounted at 4. This beacon radiates a beam of energy which the pilot may follow until he comes within the range of the course-marking beacons.

The transmitter may comprise as shown in Fig. 1, a common source 10 of constant high frequency oscillations supplying excitation to power amplifiers 12, 13, 18 and 19. The power amplifiers 12, 13, 18 and 19 are also connected with modulating potential sources 15, 14, 17 and 16 respectively. These four modulating potential sources may comprise any means for supplying the characteristic guiding modulations such as "left", "right", "up", and "down" to the carrier waves.

Each amplifier is connected with an aerial system of the desired directivity.

The transmitter power amplifiers and modulators may be located at their respective antennas as shown or all transmitters may be grouped in one place and connected to their respective antennas by means of suitable transmission lines.

What is claimed is:

1. A radio beacon system comprising four directive transmitters each adapted to transmit energy in a beam whose directive axis forms an acute angle with a line representing the general direction of a predetermined landing course, the axes of said beams lying in two planes one of which is vertical and perpendicular to the other, the acute angles so formed being equal, means including a phonograph record and pick up device for repeatedly producing a sequence of modulation waves representing word sounds, and means operative in synchronism with the rate of repetition of said sequence of modulation waves for applying the same distributively to each transmitter, thereby to sequentially modulate the energies respectively radiated by each transmitter.

2. In a transmitter system for use in directing aircraft to a landing on a given landing field, at least four short-wave directive radiators each arranged to radiate energy along a zone slightly divergent in a given direction above, below, to one side, or to the other, of a predetermined landing path, the fields of said radiators being of equal amplitude on said path, and means including a phonograph record and pick-up device for impressing a distinguishable voice modulation on the energy emanating from each of said radiators, said modulation being applied sequentially to the short-waves of each directive radiator.

3. A radio beacon system comprising at least four separate directive transmitters adapted to transmit energy in concentrated low-lying beams the axes of which converge toward each other at an intended landing point for aircraft, modulating means including a voice record and phonograph pick-up device for impressing characteristic signals representing uttered words upon the energy from each transmitter, means for causing each successive word as uttered to be applied in rotation to successive ones of the energy beams and to be distinctively identified therewith, receiving apparatus carried aboard said aircraft, and sound reproducing means operative under control of said receiving apparatus to indicate the occurrence of a deviation of said aircraft from a course centrally disposed with respect to the axes of said beams, and to identify the particular beam toward which the deviation is made by reference to the characteristic utterance by which the energy of said beam is modulated.

4. In a radio beacon system for guiding an aircraft along a landing course, a combination of four directive beam radiators each aimed in a direction slightly divergent from the axis of said landing course, one of said beams being above and another of said beams being below said course, while the remaining beams lie respectively to one side and to the other of said course, a source of carrier waves for energizing said radiators, means including a sound record and sound record pick-up device for sequentially modulating the carrier wave energy emanating from each of said radiators, and receiving apparatus carried aboard said aircraft and adapted to reproduce the sounds of distinguishing words representing the modulations of the respective beams, the amplitude of reproduction of said sounds being dependent upon the locus of said aircraft with respect to different ones of said beams.

5. A radio beam transmitting system comprising four short wave directive radiators arranged with their directive axes aimed one above, one below, one to the right, and one to the left of an intended landing path for aircraft, means for modulating the short waves of said radiators by voiced enunciations of directional significance appropriate to each radiator, means for applying said enunciations periodically and sequentially to the respective modulating means of each radiator, and means for maintaining the repetition rate of the enunciations in agreement with the repetition rate of application of the modulations to the respective radiators.

6. A system in accordance with claim 5 and having a phonograph and a record of words to be successively repeated, said phonograph and record being comprised in the several aforesaid means.

CLARENCE W. HANSELL.